United States Patent [19]

Fujii

[11] 3,886,300

[45] *May 27, 1975

[54] METHOD FOR PREPARING BLAND CASEINATES

[75] Inventor: Joanne G. Fujii, Chicago, Ill.

[73] Assignee: Beatrice Foods Company, Chicago, Ill.

[ * ] Notice: The portion of the term of this patent subsequent to May 13, 1992, has been disclaimed.

[22] Filed: July 28, 1972

[21] Appl. No.: 276,169

[52] U.S. Cl. ............... 426/656; 260/120; 426/659; 426/565; 426/582; 426/471; 426/587
[51] Int. Cl. .............................................. A23j 1/20
[58] Field of Search ............ 99/20, 14, 17; 260/120, 260/119; 426/364, 212, 356, 360, 185, 186

[56] References Cited
UNITED STATES PATENTS

| | | | |
|---|---|---|---|
| 2,401,919 | 6/1946 | Ender | 99/20 |
| 3,040,018 | 6/1962 | Wingerd | 99/20 |
| 3,420,811 | 1/1969 | Wieren et al. | 99/20 |
| 3,535,304 | 10/1970 | Muller et al. | 99/20 |
| 3,579,354 | 5/1971 | Kasik et al. | 260/120 |

*Primary Examiner*—Raymond N. Jones
*Assistant Examiner*—Thomas G. Wiseman
*Attorney, Agent, or Firm*—Cushman, Darby & Cushman

[57] ABSTRACT

Bland caseinates are produced by heating a solution of an alkali or alkaline earth caseinate and an alkaline earth salt to a temperature of at least 140°F at a temperature increase of about 4° per minute. A coagulum forms and is separated from the mother liquid. After washing and drying, the coagulum is free of objectionable odors and taste normally associated with caseinates. The bland caseinates may be incorporated in substantial amounts in food products. The preferred caseinate is sodium caseinate and the preferred alkaline earth salt is magnesium chloride.

22 Claims, No Drawings

METHOD FOR PREPARING BLAND CASEINATES

The present invention relates to a method of producing a bland caseinate and to the product obtained thereby. More particularly, the invention relates to caseinates which do not contain the objectionable flavor and odor normally associated with caseinates, and which, therefore, allow the incorporation of the present caseinates in substantial amounts in food compositions.

As is well known in the art, caseinates are valuable sources of protein and may be used to substantially upgrade the protein content of food compositions. However, caseinates have very objectionable odors and flavors, and, therefore, can be incorporated into foods only in relatively small proportion. Otherwise, the objectionable odor and flavor of the caseinates can easily override the natural flavor of the food and result in a food composition which is not acceptable from a flavor and odor point of view. A number of methods have been described in the art for removing the objectionable odor and flavor of caseinates and these methods do, generally, reduce the degree of objectionable odor and flavor, at least to some extent. However, none of the known methods are capable of producing caseinates with such low levels of objectionable flavor and odor as to allow the use of substantial amounts of caseinates in food compositions. Thus, heretofore, the amount of caseinates which could be used in food compositions has been severely limited.

From a nutritional point of view, it would be desirable to provide caseinates which have very low levels of objectionable odors and flavors and which, therefore, allow substantial amounts of the caseinates to be incorporated in the food compositions. Accordingly, it is an object of the invention to provide a method of producing a bland caseinate. It is a further object of the invention to provide a bland caseinate for the incorporation thereof into food compositions for increasing the protein content of those compositions. Other objects will be apparent from the following detailed disclosure and claims.

Broadly stated, the present invention resides in the discovery that the objectionable odor and taste constituents of caseinates may be preferentially separated from a solution of the caseinate and an alkaline earth salt. Basically, by heating a solution of an alkaline earth salt and the caseinate in a manner which causes a coagulation of the protein, the resulting coagulum can be separated from the liquid and the coagulum, after washing, is essentially a bland caseinate.

The caseinate may be any of the alkali or alkaline earth caseinates, especially sodium caseinate and calcium caseinate, and the alkaline earth salt may be any salt, e.g. a nitrate, carbonate, sulfate, acetate or halide, but the halide is the preferred salt and the chloride or fluoride is the best mode. Since the method of the invention depends upon the solution of both the alkaline earth salt and the caseinate, it is preferred that the more soluble forms of each be used. For this and other reasons noted below, the most preferred embodiment of the invention is the use of magnesium chloride and sodium caseinate. In view thereof, the invention will be illustrated in terms of this most preferred embodiment hereinafter, although the invention is applicable to the foregoing breadth. Also, while the caseinate and halide may be dissolved in any suitable solvent, for ease and simplicity of operation the solvent is preferably substantially an aqueous solvent, e.g. only water. Thus, the preferred solvent, water, will be hereinafter referenced in illustrating the invention, but the invention is not limited thereto.

A water solution of magnesium chloride and sodium caseinate is prepared, preferably by first dissolving the magnesium chloride in the water and then dissolving the sodium caseinate in the resulting solution. In the most preferred embodiment, the amount of magnesium chloride, on a weight basis, is 30 to 33 of the sodium caseinate, although any percentages, less than or greater than this range, may be used since only the yield of the product and not the purity is affected. However, for convenience, the magnesium chloride is from at least 20 to up to 60 percent of the weight of sodium caseinate. The amount of caseinate dissolved in the water may be up to saturation amounts, but preferably the amount of caseinate will be from 1 to about 30 percent by weight of the water, e.g. 5 to 15, especially 10 percent. After the solution of sodium caseinate and magnesium chloride has been prepared, the solution is slowly heated to a temperature of at least 140°and up to 155°F, especially to a temperature of about 147°±3°F. The heating step should be slow enough to ensure that the magnesium chloride and caseinate have sufficient time to interact. Generally, the rate of increase of temperature in this heating step should be no greater than 5°F per minute and preferably no greater than 4°F per minute, especially 3°F per minute. There is no lower limit on the rate at which the temperature of the solution of magnesium chloride and sodium caseinate is heated, but for economic reasons, the rate of temperature increase of the solution should be at least 0.3°F per minute, e.g. at least 0.5°F per minute. In any regard, the rate of heating should be great enough that the required temperatures, as noted above, are reached before any substantial amount of bacterial growth takes place in the solution. The heating is continued until the protein in the solution coagulates, e.g., usually within ½ hour, especially 1-10 minutes after the solution reaches the above-noted temperatures. The coagulation of the protein will usually be in the form of a rather frothy or cellular-like solid, which coagulum will have a density less than the density of the liquid. Therefore, the coagulum will rise to the top of the mother liquid. After the coagulum has been formed and begins to rise to the top of the mother liquid, it is preferred that a short dwell time at the elevated temperature be provided in order to insure that all of the coagulum has separated from the mother liquid and has risen to the top of the mother liquid. This dwell time is not at all critical but from one minute up to several hours will insure that all of the coagulum has separated from and has risen to the top of the mother liquid.

After the coagulum has formed at the top of the mother liquid, the coagulum and mother liquid are preferably cooled, e.g., to below 130°F, more preferably to about room temperature, and the mother liquid is removed from the coagulum. The mother liquid may be removed simply by draining from the bottom of the vessel containing the mother liquid and the coagulum, or the mother liquid and coagulum may be separated by any conventional means such as filtration, centrifugation and the like. Alternately, the mother liquid may be simply decanted from the coagulum. In any regard, the coagulum is separated from the mother liquid and thereafter the coagulum, preferably, is washed with water to remove any additional portions of the mother liquid which is occluded in the coagulum. This washing step may be performed with any liquid which will not substantially dissolve the protein, e.g. higher alkyl alcohols, ketones and the like, but the washing step can be simply accomplished only with cool water and this is the preferred embodiment. However, the washing step should be carried out at temperatures sufficiently low that substantial amounts of the coagulum will not be dissolved in the wash. Therefore, temperatures below 85°F, preferably no greater than 70°F, e.g. below 60°F are preferred. In one regard, temperatures, between 40° and 50°F are preferred, since these temperatures are easily obtainable and insure that substantially none of the coagulum will redissolve in the wash. The wash may be carried out a number of separate times in order to insure that the mother liquid is removed from the coagulum. The mother liquid and any wash liquid will contain most of the objectionable odor and flavor substituents of the original sodium caseinate, and after removal of these liquids from the coagulum, the coagulum will retain very low levels to essentially none of the objectionable odor and flavor substituents. The degree of reduction of objectionable odors and flavors will, in part, depend on carefully dissolving all of the caseinate, slowly heating the solution of caseinate and salt, cleanly separating the coagulum from the mother liquid and completely washing the coagulum. In this latter regard, the coagulum is advantageously pulverized before or during washing by any conventional mechanical means, e.g. a high-speed mixer rotated in the mother liquid or the wash liquid. Preferably, the coagulum is broken to average particle sizes of less than one-half inch, e.g. less than one-quarter or one-eighth inch.

After the washing step, the coagulum may be broken up or pulverized, if not broken before or during the washing step, or otherwise placed in a physical form, as desired. The breaking of the coagulum can be by any conventional mechanical means such as a pulverizer, rod mill, pebble mill, mortar and pestle and the like, although in these cases, it is preferred to first dry the coagulum. Drying can be accomplished in any conventional manner such as oven drying, vacuum drying and the like at temperatures up to 400°F. Alternately, the coagulum can be pulverized, suspended in water and spray dried to form a spray-dried powder.

It is preferred that the coagulum be pasteurized under conventional conditions at some point after the coagulum has been produced. This can be accomplished either by allowing the coagulum to dwell at the temperatures recited above for a sufficient time to substantially kill or retard the bacteria therein, or the drying step may be used to pasteurize the coagulum. In this regard, if the coagulum is suspended in water and spray dried, at conventional spray drying temperatures, then the pasteurization step will be accomplished.

As can be appreciated from the above, the method of producing the bland caseinate resides in preparing a solution of the alkali or alkaline earth caseinate and an alkaline earth salt, heating the solution to a temperature of at least 140°F, allowing a coagulum to form and separating the coagulum from the mother liquid. Preferably, the coagulum is washed after separating from the mother liquid to remove remaining mother liquid from the coagulum, and more preferably, the coagulum is broken up prior to or during the washing step, which washing step may be repeated a plurality of times, e.g. one to ten times. Of course, the wash liquid must be a non-solvent for the coagulum and preferably the wash liquid is simply water. However, when water is used, it should be used at a temperature of below 85°F in order to insure that substantially none of the coagulum will be dissolved in the wash liquid. As noted hereinbefore, the preferred caseinate is sodium caseinate, since it is the most widely used caseinate and magnesium chloride is the preferred alkaline earth salt, since this particular alkaline earth halide salt will provide better results in terms of removing objectionable odor and flavor than other alkaline earth salts in general or halides in particular. In this regard, the quite superior results obtained with the use of magnesium chloride, as opposed to other alkaline earth halides, constitutes a further invention. When magnesium chloride is used, the resulting caseinate is so bland that it can be used alone, or in major amounts, with a foodstuff and has no objectionable odor or taste.

Water is the preferred solvent for the process since it allows easy operation of the process and additionally will remove more of the objectionable odors and flavors from the caseinate due to the greater solubility of those odoriferous and objectionable taste components of caseinates, especially sodium caseinate. Further, for best results, the alkaline earth salt should be about 30 to 33 percent of the caseinate, since this range appears to remove more of the objectionable odors and flavors from the caseinate. Since the product will normally be used in a dried form, it is preferred to dry the washed coagulum, although the washed coagulum may be used in the suspended form. Of course, as noted above, in order to prevent bacterial growth, the product should be pasteurized and then the product is ready for incorporating into foodstuffs.

With the present bland caseinate, a foodstuff may contain up to 40 percent by weight of the present bland caseinate, as opposed to conventional bland caseinates wherein, normally, less than 5 percent may be used. For most uses, however, less than 10 percent of the present casinate will be used, since within that range, essentially no objectionable odors and flavors of caseinates are detectable in food compositions and yet these amounts of caseinate will provide nutritious products in terms of the protein content. However, the preferred embodiment of the invention, as discussed above, is so completely free of objectionable odor and taste that it may be used in any amount in a foodstuff.

The present bland caseinate may be incorporated into any edible foodstuffs for animals, including human foodstuffs, such as milk products, e.g. skim milk, whole milk, cream, cheese, sour cream, etc., confectionary products, e.g. icings, toppings, fillings, candy, etc., meat products including ground meat, e.g. ground pork and ground beef, vegetable products, including processed carrots, potatoes, beans etc., fruit products including jams, jellies, and canned fruits, e.g. apples, oranges, tomatoes, pears, etc., and grain products including processed rice, wheat, barley, soybeans etc.

The invention will be illustrated by the following examples, but the invention is not limited to the examples and is fully applicable to the foregoing disclosure.

EXAMPLE 1

32 grams of magnesium chloride are dissolved with stirring in 1,000 grams of water maintained at 80°F. After solution of the magnesium chloride, 100 grams of sodium caseinate are slowly dissolved in the resulting solution, with stirring at 80°F. After the sodium caseinate is dissolved, the solution, with stirring, is slowly heated in a glass vessel by means of a gas burner at a rate of approximately 2.0°F per minute. After approximately 26 minutes, a temperature of 143°F is reached and the solution is allowed to dwell at that temperature for approximately 5 minutes, during which a coagulum is formed and rises to the top of the mother liquid. The mother liquid and coagulum are cooled to about room temperature and the mother liquid is decanted from the coagulum. The coagulum is then suspended in water at room temperature and subjected to a high speed mixer which breaks up the coagulum to particle size of less than one-eighth inch. The pulverized coagulum is then separated from the wash water by filtering in a laboratory filter. The coagulum is again resuspended in water at about room temperature and, after stirring, is again filtered. The coagulum is then further purlverized with a mortar and pestle, then suspended in water and spray dried at 350°F inlet/200°F outlet to a dry powder.

The resulting powder is essentially free of objectionable odor and taste.

EXAMPLE 2

The powder of Example 1 is dispersed in milk at a level of 15 percent by weight of the milk. After stirring, and cooling, the milk is tasted and no detectable caseinate odor or flavor is present.

EXAMPLE 3

The milk of Example 2 is mixed with sugar, imitation strawberry flavor and rennet to form a conventional ice cream composition. The ice cream composition is then frozen while being beaten with air to form ice cream. The resulting ice cream has no detectable odor or taste of caseinate.

EXAMPLE 4

10 percent by weight of the powder of Example 1 is mixed with non-fat dry milk solids. When the mixture is reconstituted with water as non-fat milk, the milk is very high in protein and has no objectionable odor or taste.

EXAMPLE 5

To a standard confectionary white icing, e.g. corn syrup, egg whites and vanilla, is added 15 percent by weight of the powder of Example 1. After cooking and cooling, the icing is high in protein and has no objectionable odor or taste.

EXAMPLE 6

Ground beef is mixed with 30 percent by weight of the powder of Example 1 and fried patties thereof have no objectionable odor or taste.

EXAMPLE 7

A conventional corn meal snack food mixture is prepared with 25 percent fat (90° melt coconut fat) and 75 percent corn meal. To the mixture is added 30 percent water and 30 percent of the powder of Example 1. After cooking and extrusion, a cornmeal snack food having no objectionable odor and taste results.

EXAMPLE 8

A composition resembling the consistency of Mozzarella cheese is prepared by heating to about 180°F a composition of 25 parts 90° melt coconut fat, 20 parts of water and 75 parts of the powder of Example 1.

EXAMPLE 9

Example 8 is repeated except that to the composition is added 10 percent of a cheddar cheese flavor produced according to the process of U.S. Pat. No. 3,674,508. The product has the consistency and flavor of mild cheddar cheese.

EXAMPLE 10

To a conventional cream chicken soup is added 4 percent by weight of the powder of Example 1 and heated to serving temperature with stirring. The resulting soup has no objectionable caseinate odor or taste and is high in protein value.

What is claimed is:

1. A method of producing a bland caseinate comprising preparing a solution of an alkali or alkaline earth caseinate and an alkaline earth salt selected from a nitrate, carbonate, sulfate, acetate and halide, slowly heating the solution to a temperature of at least 140°F. for a period of time sufficient to allow the protein to form a coagulum and separating the coagulum from the mother liquid and washing the coagulum, the caseinate being in the solution in amounts between 1 and 30 w/w percent and the salt being in the solution in amounts of between 20 and 60 w/w percent based on the weight of the caseinate.

2. The method of claim 1 wherein the coagulum is broken up prior to or during the washing step.

3. The method of claim 1 wherein the washing step is repeated a plurality of times.

4. The method of claim 1 wherein the wash liquid is a non-solvent for the coagulum.

5. The method of claim 4, wherein the wash liquid is water.

6. The method of claim 5 wherein the water wash is at a temperature below 85°F.

7. The method of claim 1 wherein the solution is heated at a rate of less than 5°F per minute.

8. The method of claim 1 wherein the caseinate is sodium caseinate.

9. The method of claim 1 wherein the alkaline earth salt is a halide.

10. The method of claim 9 wherein the halide is the magnesium chloride.

11. The method of claim 1 wherein the solution is an aqueous solution.

12. The method of claim 1 wherein the said percentage of salt is 30 to 33 percent.

13. The method of claim 1 wherein the solution is heated to a temperature below 155°F.

14. The method of claim 1 wherein the washed coagulum is dried.

15. The method of claim 14 wherein the drying is conducted at a temperature below 250°F.

16. The method of claim 15 wherein the coagulum is spray dried.

17. The method of claim 1 wherein the coagulum is pasteurized.

18. A method of producing a bland caseinate comprising preparing a water solution of sodium caseinate and magnesium chloride wherein the amount of caseinate is 1–30 w/w percent of the water and the said chloride is 30 percent to 33 percent by weight of the said caseinate, heating the solution at a rate less than 5°F. per minute until a temperature between 140° and 155°F. is reached, allowing a protein coagulum to form, separating the coagulum from the mother liquid, and washing the coagulum with water.

19. The method of claim 18 wherein the coagulum is pasteurized.

20. The method of claim 19 wherein the coagulum is dried.

21. The method of claim 18 wherein the coagulum is broken up prior to or during the washing.

22. The method of claim 20 wherein the coagulum is spray dried.

* * * * *